United States Patent [19]
Yamaguchi

[11] Patent Number: 4,513,925
[45] Date of Patent: Apr. 30, 1985

[54] DRAG BRAKE DEVICE FOR SPINNING REEL

[75] Inventor: Nobuyuki Yamaguchi, Tokyo, Japan
[73] Assignee: Daiwa Seiko Co., Ltd., Tokyo, Japan
[21] Appl. No.: 529,976
[22] Filed: Sep. 7, 1983
[51] Int. Cl.³ .............................................. A01K 89/02
[52] U.S. Cl. ............................................... 242/84.5 A
[58] Field of Search ................. 242/84.5 A, 84.5 R, 242/84.51 A, 84.51 R, 84.2 A, 84.21 A, 84.21 R

[56] References Cited

U.S. PATENT DOCUMENTS

| | | | |
|---|---|---|---|
| 2,863,617 | 12/1958 | Chapin et al. | 242/84.5 A |
| 3,296,731 | 1/1967 | Wood | 242/84.21 A |
| 4,288,046 | 9/1981 | Morimoto et al. | 242/84.21 R |
| 4,391,419 | 7/1983 | Iwama et al. | 242/84.5 A |

Primary Examiner—Billy S. Taylor
Attorney, Agent, or Firm—Flam & Flam

[57] ABSTRACT

A drag brake for a spinning reel includes a stack of friction disks accommodated in a cup. A member threadedly mounted in the cup adjusts the braking force through a resilient element. The brake adjusting member is stopped in its outward retracting movement by a transverse spring extending across and mounted by the cup. A knob is attached to the end of the brake adjusting member and has an internally corrugated skirt that surrounds the cup. The spring projects beyond the cup to engage the corrugations yieldingly to maintain the setting of the brake.

1 Claim, 5 Drawing Figures

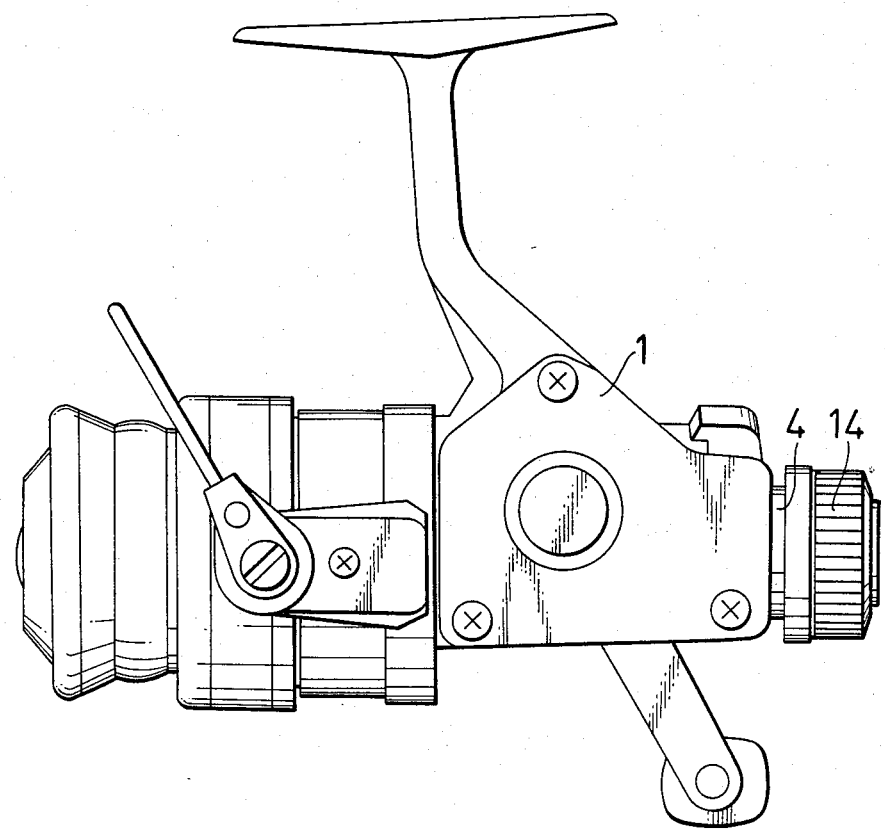
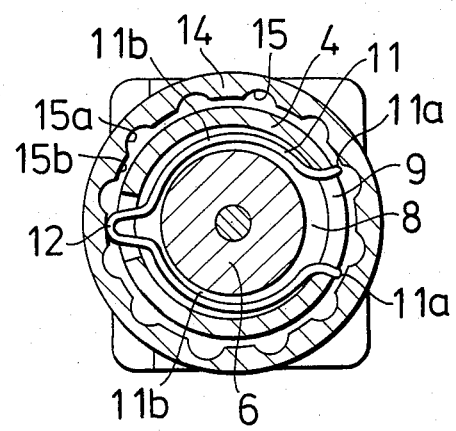

DRAG BRAKE DEVICE FOR SPINNING REEL

FIELD OF INVENTION

This invention relates to an improvement to a brake device for a spinning reel.

BACKGROUND OF THE INVENTION

The adjustment knob of a drag brake device provided in the rear portion of a conventional spinning reel of this kind has the drawbacks that since no fall-preventing member is provided, the adjustment member can drop off its screw portion when it is rotated in the direction in which the braking force is reduced, and since the rotation is continuous without any jumps, the knob can not be restricted and held at the drag brake adjustment position set by the angler.

To eliminate these problems, the provision of a fall-preventing mechanism for the adjustment knob, and resilient restriction of the rotation of the adjustment knob have been proposed in the past in patents such as U.S. Pat. Nos. 2,863,617, 3,074,664, 3,810,592, 4,238,085, and so forth. However, since these prior-art devices provide each of these mechanisms separately, the construction thereof is extremely complicated and difficult to assemble and a large space must be provided in order to incorporate the mechanisms.

SUMMARY OF INVENTION

In view of the background described above, the present invention is designed to prevent the adjustment knob dropping off by use of a spring that resiliently limits the adjustment knob. In a spinning reel of the type in which a brake member is fitted to the rear of a spool-sliding shaft, and an adjustment member is retractably screwed into the inside of a cylinder projecting from a housing around the outer periphery of the brake member, and is pressed into contact with the brake member via a resilient member so as to control the slippage of the spool-sliding shaft, the gist of the present invention resides in a drag brake device for a spinning reel characterized in that an engagement portion and a through-hole are defined at the end portion of the cylinder so as to be opposite to each other, base ends of an annular spring fitting into the cylinder engage with the engagement portion, a protuberance formed at the center of the annular spring fits into the through-hole, an anchoring step portion for the annular spring is formed at the rear of a screw portion of the adjustment member, a knob cylinder positioned over the outer circumferential surface of the cylinder is attached integrally to the adjustment member, and corrugations for engaging with the protuberance of the annular spring are defined axially along the inner circumferential surface of the knob cylinder.

BRIEF DESCRIPTION OF THE DRAWINGS

A detailed description of the invention will be made with reference to the accompanying drawings wherein like numerals designate corresponding parts in the several figures.

FIG. 1 is a side view of a drag brake device for a spinning reel in accordance with the present invention.

FIG. 3 is a sectioned view showing the operating state of the device.

DETAILED DESCRIPTION OF PREFERRED EMBODIMENT

The following detailed description is of the best presently contemplated mode of carrying out the invention. This description is not to be taken in a limiting sense, but is made merely for purposes of illustrating the general principles of the invention, since the scope of the invention is best defined by the appended claims.

Figure 4:
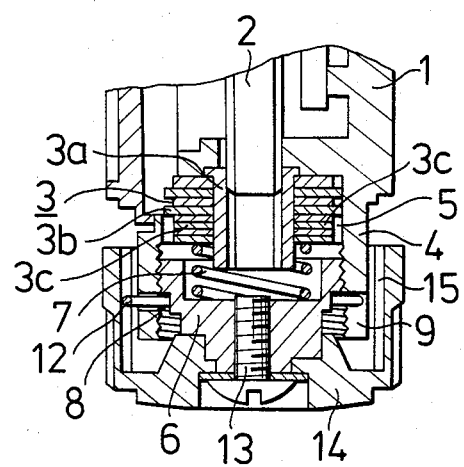
FIG. 4 is a transverse sectioned plan view of the device.

As shown in FIG. 4, a brake member 3 with a cylindrical shaft 3a which can slide freely in the axial direction but which rotates integrally with a spool-sliding shaft 2 is fitted to the spool-sliding shaft 2 which projects from the rear portion of a casing 1 of a spinning reel. A cylinder 4 projects from the housing 1 integrally with the outer periphery of the brake member 3. As is known in the art, the brake member 3 consists of a plurality of friction plates 3c anchored to the spool-sliding shaft 2 over the cylinder shaft 3a, and friction plates 3b engaging with an anchor groove 5 formed within the cylinder 4 and attached rotatably to the spool-sliding shaft 2.

An adjustment member 6 is screwed retractably to the inside of the cylinder 4, as shown in FIG. 4, and pushes the brake member 3 by a spring 7. An anchoring step portion 8 is formed at the rear end of the thread of the adjustment member 6.

Figure 2:
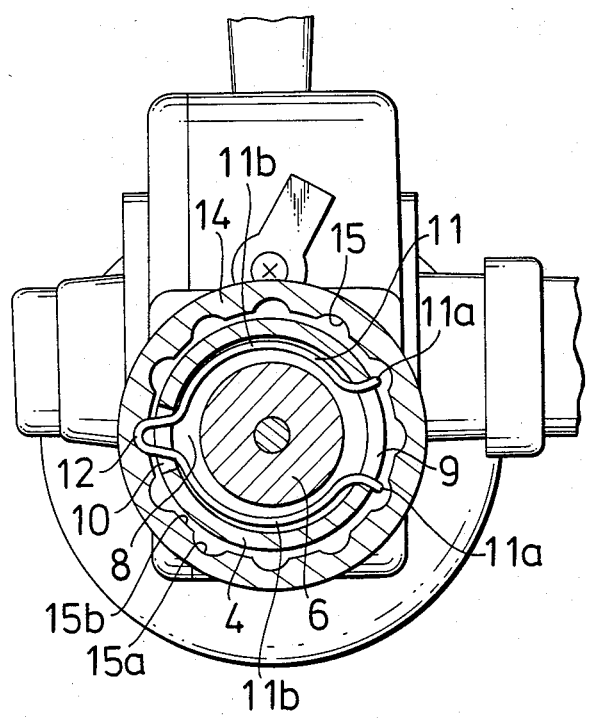
FIG. 2 is a sectioned view of the drag brake device of FIG. 1.
Figure 5:
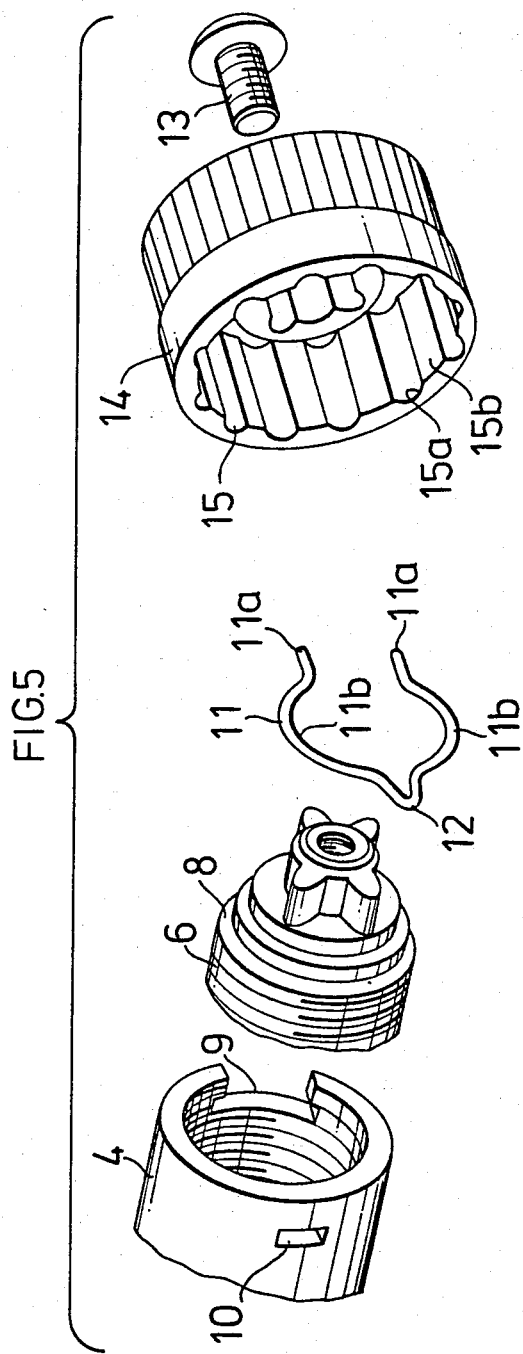
FIG. 5 is an exploded perspective view of the principal parts of the device.

A notched engagement portion 9 and a through-hole 10 are formed near the end of the cylinder 4 so as to be opposite to each other, as shown in FIG. 5, and end portions 11a of an annular spring 11 fitting into the cylinder 4 engages with the engagement portion 9, as shown in FIGS. 2 and 3. The spring 11 fits into the cylinder 4 so that a protuberance 12 at the center of the spring projects outward through the through-hole 10. Annular parts 11b of the spring 11 come into close contact with the anchoring step portion 8 of the adjustment member 6 in order to prevent the adjustment member 6 falling out of the cylinder 4.

A knob cylinder 14, which fits over the outer circumference of the cylinder 4 with a gap between them and is held by a set screw 13, is integrally attached to the adjustment member 6, as shown in FIG. 4, and a plurality of corrugations 15 are defined along the inner circumferential surface of the knob cylinder 14 in the axial direction so that the protuberance 12 of the annular spring 11 engages with them, as shown in FIG. 5. In this embodiment, 12 each of recesses 15a and projections 15b define the corrugations 15.

The embodiment of the invention is constructed as described above. When the knob cylinder 14 is rotated, the adjustment member 6 moves back or forth with respect to the cylinder 4 and pushes against the brake member 3 by the spring 7, thereby braking the spool-sliding shaft 2. In this case, since the protuberance 12 of the annular spring 11 resiliently engages with and disengages from the axial corrugations 15 within the knob cylinder 14 during the rotation of the knob cylinder 14, the rotation is restricted and held in steps. In other words, in the device of this embodiment, when the knob cylinder 14 is rotated, the protuberance 12 of the annular spring 11 and the corrugations 15 within the knob cylinder 14 engage with and disengage from each another 12 times every time the knob cylinder 14 rotates once. Thus, the knob cylinder 14 rotates and transmits an alternating weak-and-strong feeling 12 times to the hand of the angler holding a rod. As described above, since the rotation of the knob cylinder 14 is limited and held in steps in the device of the present invention, it becomes possible to prevent the knob cylinder 14 from rotating easily, particularly when the drag adjustment is set to a low level.

Back-rotation of the knob cylinder 14 is prevented by the anchoring step portion 8 of the adjustment member 6 coming into contact and engaging with the annular parts 11b of the annular spring 11. Hence, the adjustment member 6 is prevented from dropping out of the cylinder 4.

The annular spring 11 can be formed by changing the outer shape of a piece of wire of a round cross-section into a flat sheet-like spring, and its material can be a synthetic resin as well as a metal. The materials for the housing 1, adjustment member 6, and knob cylinder 14 can also be a synthetic resin instead of a metal. Although the number of recesses and projections 15a, 15b forming the corrugations 15 within the knob cylinder 14 is 12 in the embodiment described above, any number thereof can be selected.

In a drag brake device provided behind a spinning reel of the kind described above, the present invention employs a construction in which an engagement portion and a through-hole are formed at the end of a cylinder so as to be opposite to each other, base ends of an annular spring fitting into the cylinder engage with an anchoring step portion, a protuberance of the annular spring projects outward from the through-hole so that the annular parts of the spring engage with an engagement portion of an adjustment member, and corrugations formed along the inner circumferential surface of the knob cylinder in the axial direction engage with the protuberance of the annular spring. According to this construction, it is possible to realize both functions of preventing the adjustment member dropping out of the cylinder and restricting the position of the knob cylinder with a uniformly stepped force from a minimum to a maximum drag adjustment quantities, by use of a single annular spring. Thus the present invention can simplify the construction of a drag brake mechanism and provides excellent practical advantages.

Intending to claim all novel, useful and unobvious features shown or described, I make the following claims:

1. In a spinning reel of the type having a brake member fitted at the rear of a spool-sliding shaft, and an adjustment member retractably screwed into the inside of a cylinder projecting from a housing around the outer periphery of said brake member and pressed into contact with said brake member via a resilient member so as to control the slippage of said spool-sliding shaft, a drag brake device for a spinning reel characterized in that an engagement portion and a through-hole are defined at an end portion of said cylinder opposite to each other, base ends of an annular spring fitting into said cylinder engaged with said engagement portion, a protuberance formed at the center of said annular spring fits into said through-hole, an anchoring step portion for said annular spring is formed at an end of a screw portion of said adjustment member, a knob cylinder positioned over the outer circumferential surface of said cylinder is attached integrally to said adjustment member, and corrugations for engaging said protuberance of said annular spring are defined axially along an inner circumferential surface of said knob cylinder.

* * * * *